United States Patent
Green et al.

(10) Patent No.: US 10,524,008 B2
(45) Date of Patent: Dec. 31, 2019

(54) VIRTUAL GAMING SYSTEM BASED ON PREVIOUS SKILLS-BASED EVENTS

(71) Applicant: HIGHLIGHT GAMES LIMITED, London (GB)

(72) Inventors: Timothy Patrick Jonathan Green, Surrey (GB); Stewart James Whittle, Hertfordshire (GB); Angus Wood, London (GB)

(73) Assignee: Highlight Games Limited, London (GB)

( * ) Notice: Subject to any disclaimer, the term of this patent is extended or adjusted under 35 U.S.C. 154(b) by 106 days.

(21) Appl. No.: 15/946,592

(22) Filed: Apr. 5, 2018

(65) Prior Publication Data
US 2019/0311575 A1    Oct. 10, 2019

(51) Int. Cl.
*H04N 21/466* (2011.01)
*G11B 27/031* (2006.01)
*H04N 21/81* (2011.01)

(52) U.S. Cl.
CPC ......... *H04N 21/466* (2013.01); *G11B 27/031* (2013.01); *H04N 21/8126* (2013.01)

(58) Field of Classification Search
CPC .. H04N 21/8126; H04N 21/466; H04N 5/265; G06F 16/70; G11B 27/031; G11B 27/02
See application file for complete search history.

(56) References Cited

U.S. PATENT DOCUMENTS

| | | | |
|---|---|---|---|
| 2015/0163562 A1* | 6/2015 | Leventhal | H04N 21/8126 725/116 |
| 2018/0025078 A1* | 1/2018 | Quennesson | G11B 27/031 725/141 |
| 2018/0330574 A1* | 11/2018 | Wright | G07F 17/3288 |
| 2019/0216162 A1* | 7/2019 | Gruben | A43B 3/001 |

* cited by examiner

*Primary Examiner* — Reginald A Renwick
(74) *Attorney, Agent, or Firm* — Patent Ingenuity, P.C.; Samuel K. Simpson

(57) ABSTRACT

A system has a database that stores a plurality of audio/visual clips. Further, the system has a memory device that has a buffer with a threshold quantity of memory blocks. In addition, the system has a processor that receives the plurality of audio/visual clips in an ordered sequence for a virtual sports game. The processor also writes one or more frames of a first audio/visual clip to the buffer. Further, the processor allocates the threshold quantity of memory blocks such that the processing speed of writing one or more frames of a second audio/visual clip to the buffer is faster than a broadcast frame rate for broadcasting the first audio/visual clip. In addition, the processor writes the one or more frames of the second audio/visual clip to the allocated threshold quantity of memory blocks of the buffer.

20 Claims, 14 Drawing Sheets

VIRTUAL GAMING SYSTEM BASED ON PREVIOUS SKILLS-BASED EVENTS

BACKGROUND

1. Field

This disclosure generally relates to the field of wager-based, computerized gaming systems. More particularly, the disclosure relates to a wager-based, virtual gaming system that operates a virtual game based on previous skill-based events.

2. General Background

Virtual sports ("VS") games typically allow users to place wagers on a fictitious sequence of sporting events rather than on live or future sporting events. For example, an animation of the fictitious sequence is typically generated and displayed on a display screen (e.g., television) so that a user may view, and place a wager on, the animated sequence.

Generating the aforementioned animated sequence is typically a quite resource-intensive process. For example, motion capture devices are utilized to capture the imagery for the animation; processors then have to analyze the captured data and compose the animated sequence. The memory requirements and processing capabilities necessary to generate a single animated sequence, let alone a variety of different animated sequences often necessary to pique user interest in playing a VS game, are quite significant.

Further, generating the animated sequence is labor-intensive and time-consuming as humans are typically involved in performing the movements that are captured by a motion capture apparatus. In other words, the functioning of computers, which generate animated sequences for VS games, is diminished by having to wait extended periods of time (e.g., days, weeks, months, etc.) for humans to perform the movements necessary as inputs for such computers to generate an animated sequence.

Accordingly, computerized configurations that generate animated sequences for VS games are so computationally resource-intensive and human resource-intensive that they are unable to perform in an optimal manner. As a result, conventional configurations for generating VS games based on animated sequences are typically not scalable enough for mass deployment.

SUMMARY

A system has a database that stores a plurality of audio/visual ("NV") clips. Further, the system has a memory device that has a buffer with a threshold quantity of memory blocks.

In addition, the system has a processor that receives the plurality of A/V clips in an ordered sequence for a virtual sports game. The processor also writes one or more frames of a first A/V clip to the buffer. Further, the processor allocates the threshold quantity of memory blocks such that the processing speed of writing one or more frames of a second A/V clip to the buffer is faster than a broadcast frame rate for broadcasting the first A/V clip. In addition, the processor writes the one or more frames of the second A/V clip to the allocated threshold quantity of memory blocks of the buffer. Also, the processor reads, at the broadcast frame rate, the one or more frames of the first A/V clip from the buffer and the one or more frames of the second A/V clip from the buffer. The processor sends, at the broadcast frame rate, a gapless set of content to a playback device. The gapless set of content has the one or more video frames of the first A/V clip and the one or more video frames of the second A/V clip. Each of the plurality of A/V clips corresponds to a sports-based event occurring prior to initiation of the virtual sports game at a computing device.

Alternatively, a computer program may have a computer readable storage device with a computer readable program stored thereon that implements the functionality of the aforementioned system. As yet another alternative, a process that utilizes a processor may implement the functionality of the aforementioned system.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A virtual gaming system based on previous skill-based events is provided. Rather than generating an animation of fictitious events, which is computationally-intensive and labor-intensive, the virtual gaming system selects pre-recorded, or pre-captured, content to generate a fictitious sequence of events on which users may place a wager; thereby obviating utilization of inefficient technologies such as motion capture.

Further, the virtual gaming system improves upon the functioning of computers utilized to provide VS games with technologies other than motion capture. For instance, if pre-recorded data such as video clips was sent to a computer, those video clips would have typically been streamed simultaneously to the computer for playback with gaps between the video clips rather than the gapless playback performed by the virtual gaming system. Instead of having memory requirements for simultaneously receiving streamed video clips, the virtual gaming system obtains gapless playback by decoding frames in a pipeline. Through utilization of a buffer in a memory device, the virtual gaming system improves the functioning of a computer for non-animated sequences by reducing memory requirements.

Figure 1A:
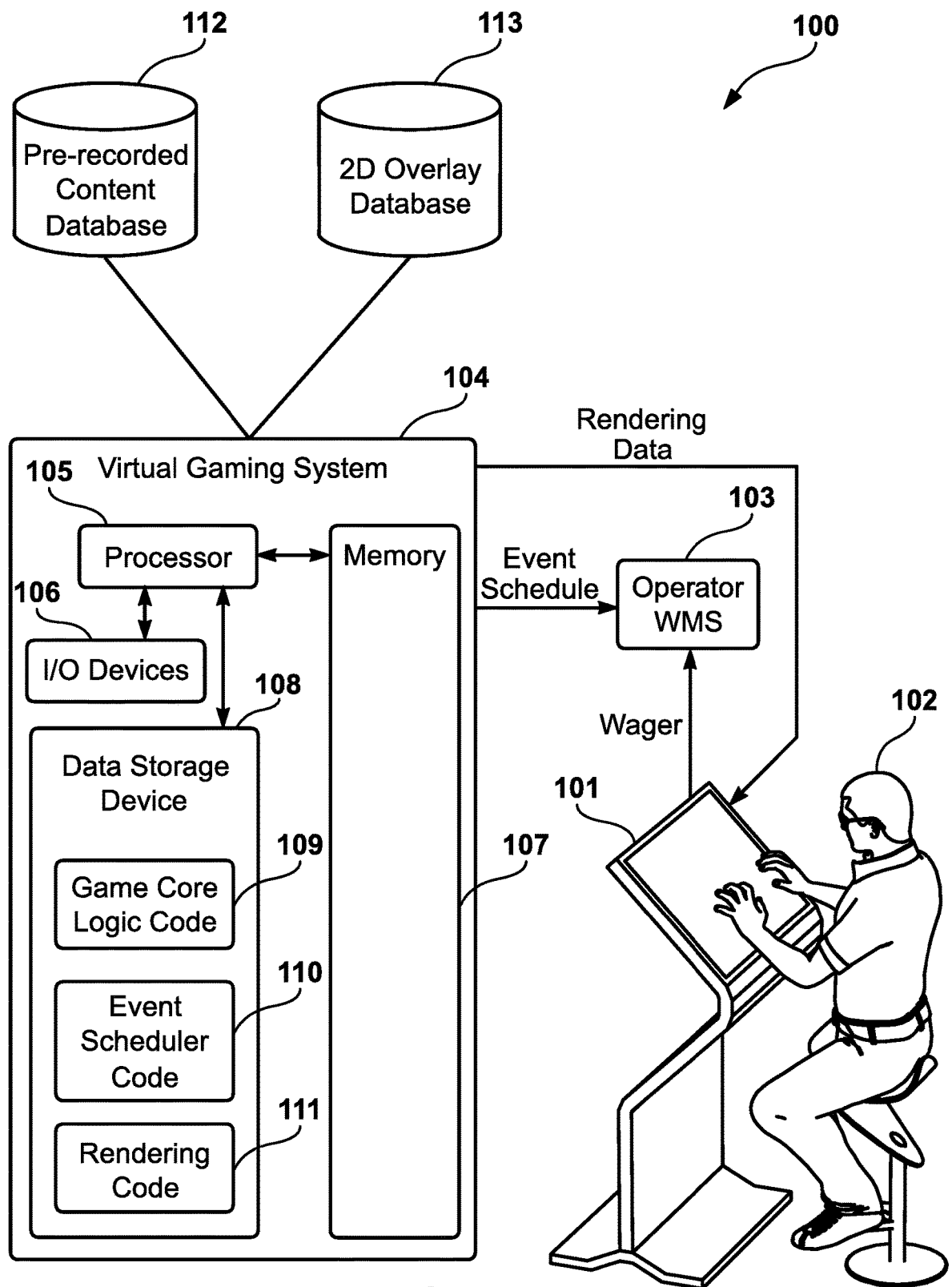
FIG. 1A illustrates a virtual game configuration that operates a virtual game in which a user may place a wager from a virtual game console.

FIG. 1A illustrates a virtual game configuration 100 that operates a virtual game in which a user 102 may place a wager from a virtual game console 101. In one embodiment, the virtual game console 101 receives inputs from the user 102 (e.g., via touch screen inputs, button activations, hand gestures, etc.) and displays content associated with operation of the virtual game (e.g., via an integrated display screen). In another embodiment, the virtual game console 101 receives inputs from the user 102, but the content associated with operation of the virtual game is displayed by, or projected onto, a display screen that is distinct from the virtual game console 101. (The projection referred to herein is not limited to operation on a flat screen, or two-dimensional projection, as three-dimensional projection (e.g., via holographic projector) may be alternatively utilized to project the associated content.)

An operator wager management system ("WMS") 103 receives the wager from the virtual game console 101 (e.g., via a computerized network, telecommunications network, wired network, etc.). After receiving the wager, the operator WMS 103 awaits an outcome of the virtual game so that the operator WMS 103 may determine what prize, if any, is won by the user 102 and/or additional users. In other words, the operator WMS 103 is associated with a gaming entity (e.g., casino, lottery, etc.) whose responsibilities include, but are not limited to, receiving wagers and distributing prizes.

The virtual gaming configuration 100 also includes a virtual gaming system 104 that schedules a virtual game and generates content to be displayed during the virtual game. Included as componentry within the virtual gaming system 104 are a processor 105, various input/output ("I/O") devices 106, a memory device 107, and a data storage device 108.

The processor 105 executes various code within the memory device 107. For instance, the processor 105 retrieves game core logic code 109, event scheduler code 110, and rendering code 111 from the data storage device 108 for operation in the memory 107.

In particular, the game core logic code 109 allows the processor 105 to operate the virtual game. For example, the game core logic code 109 may have a rules-based approach that randomly selects content associated with the virtual game for display during the virtual game. Accordingly, the game core logic code 109 may require that random data be obtained from a certified random source (e.g., a particular random number generator ("RNG")).

Further, the event scheduler code 110 allows the processor 105 to schedule events for operation of the virtual game. For example, the event scheduler code 110 may indicate that the virtual game is scheduled to be played every twenty minutes. (Other time intervals, specific times, etc. may be utilized instead.) The schedule of such time increments may be sent by the processor 105 executing the event scheduler code 110 according to a different time interval (e.g., daily transmission of schedule for virtual game operated at twenty minute intervals).

Also, the event scheduler code 110 allows the processor 105 to inform the operator WMS 103 that wagering is opened or closed for a particular iteration of the virtual game. Accordingly, the operator WMS 103 may receive wagers prior to and/or during the virtual game based on whether or not wagering is allowed at a given time, as determined by the processor 105 when executing the event scheduler code 110. The processor 105 may also send event results, as determined via execution of the event scheduler code 110, to the operator WMS 103.

The communications between the virtual gaming system 104, or any componentry thereof, and the operator WMS 103 may be performed through a network (computerized, telecommunications, wired, etc.).

In addition to operating and scheduling the virtual game, the processor 105 may execute the rendering code 111 to select content for display during operation of the virtual game. The virtual gaming system 104 is in operable communication with a pre-recorded content database 112, which may store pre-recorded video clips of skill-based events occurring prior to initiation of the virtual game, and a 2D overlay database, which may store various data that may be appended to the pre-recorded video clips. After the processor 105 determines an outcome of the virtual game, via execution of the game core logic code 109 (e.g., according to an RNG), the processor 105 may determine from the game core logic code 109 that the rendering code 111 is to be executed to compose rendering data for playback of the selected video clips and corresponding 2D overlay data. The processor 105 may send the rendering data through a network (computerized, telecommunications, wired, etc.) to the virtual gaming console 101 for display at the virtual gaming console 101. Alternatively, the processor 105 may send the rendering data to the operator WMS 103, which then sends the rendering data to the virtual gaming console 101.

Although the virtual gaming system 104 is depicted as being distinct from the virtual gaming console 101, the virtual gaming system 104, or componentry thereof, may be integrated within the virtual gaming console 101 in an alternative configuration. As a result, each virtual gaming console 101 may schedule an iteration of a virtual game specific to that particular virtual gaming console 101 rather than relying on a centralized server. Further, the rendering data may be provided directly, without a network, to a display screen of the virtual gaming console 101 in such an alternative configuration.

Figure 1B:
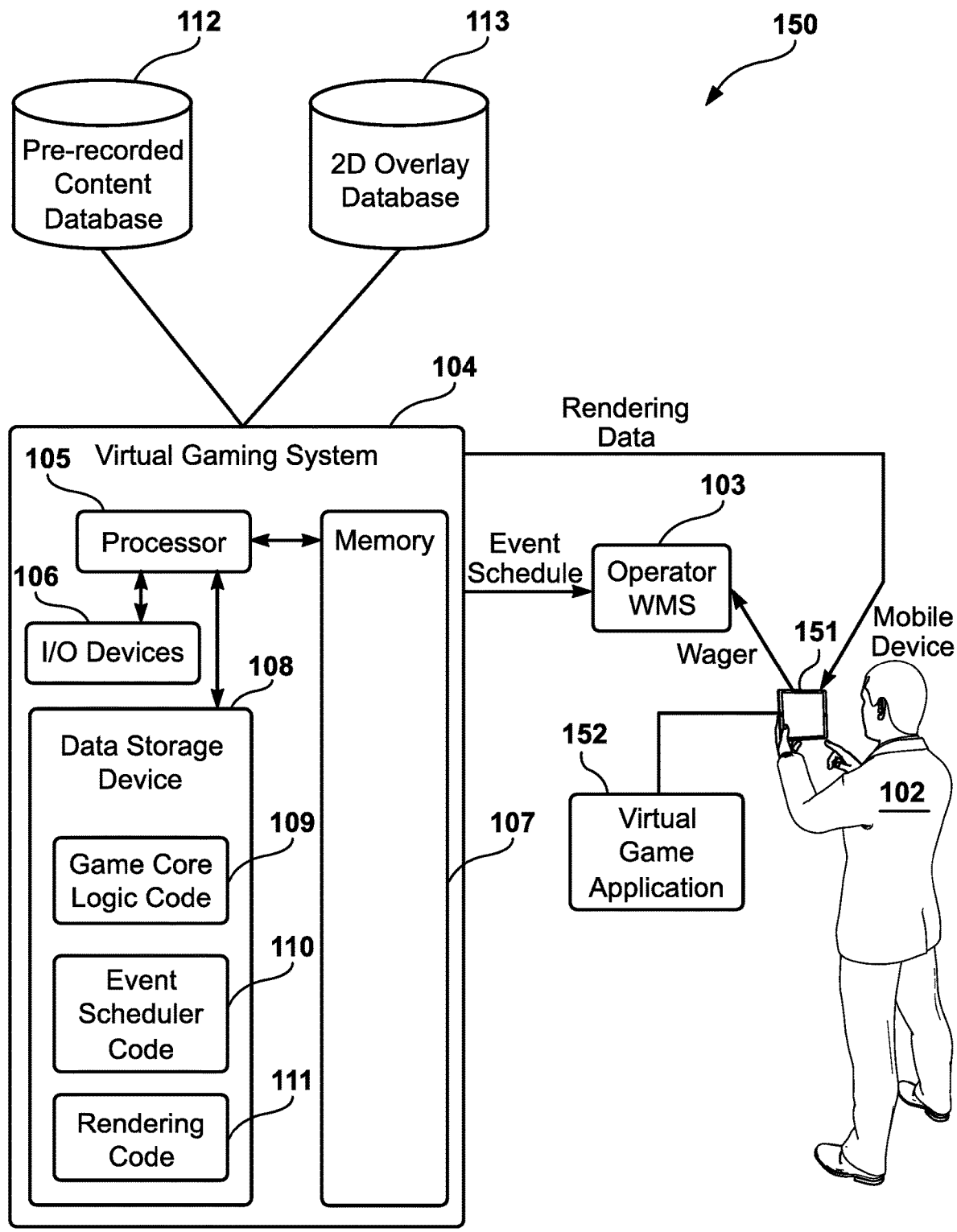
FIG. 1B illustrates a virtual game configuration that is an alternative to the virtual game configuration illustrated in FIG. 1A.

FIG. 1B illustrates a virtual game configuration 150 that is an alternative to the virtual game configuration 100 illustrated in FIG. 1A. Rather than allowing the virtual game console 101 to place a wager, the virtual game configuration 150 allows the user 102 to user a virtual game application 152 to operate the virtual game from a mobile computing device (e.g., smartphone, laptop, tablet device, smartwatch, smart wearable, etc.). In one embodiment, the mobile computing device 151 is utilized by the user 102 to send a wager to the operator WMS 103 and receive rendering data for display at the mobile computing device 151. In an alternative embodiment, the mobile computing device 151 is utilized by the user 102 to send the wager to the operator WMS 103, but the virtual gaming system 104 sends the rendering data to a display device (e.g., television) that is distinct from the mobile computing device 151.

Figure 2:
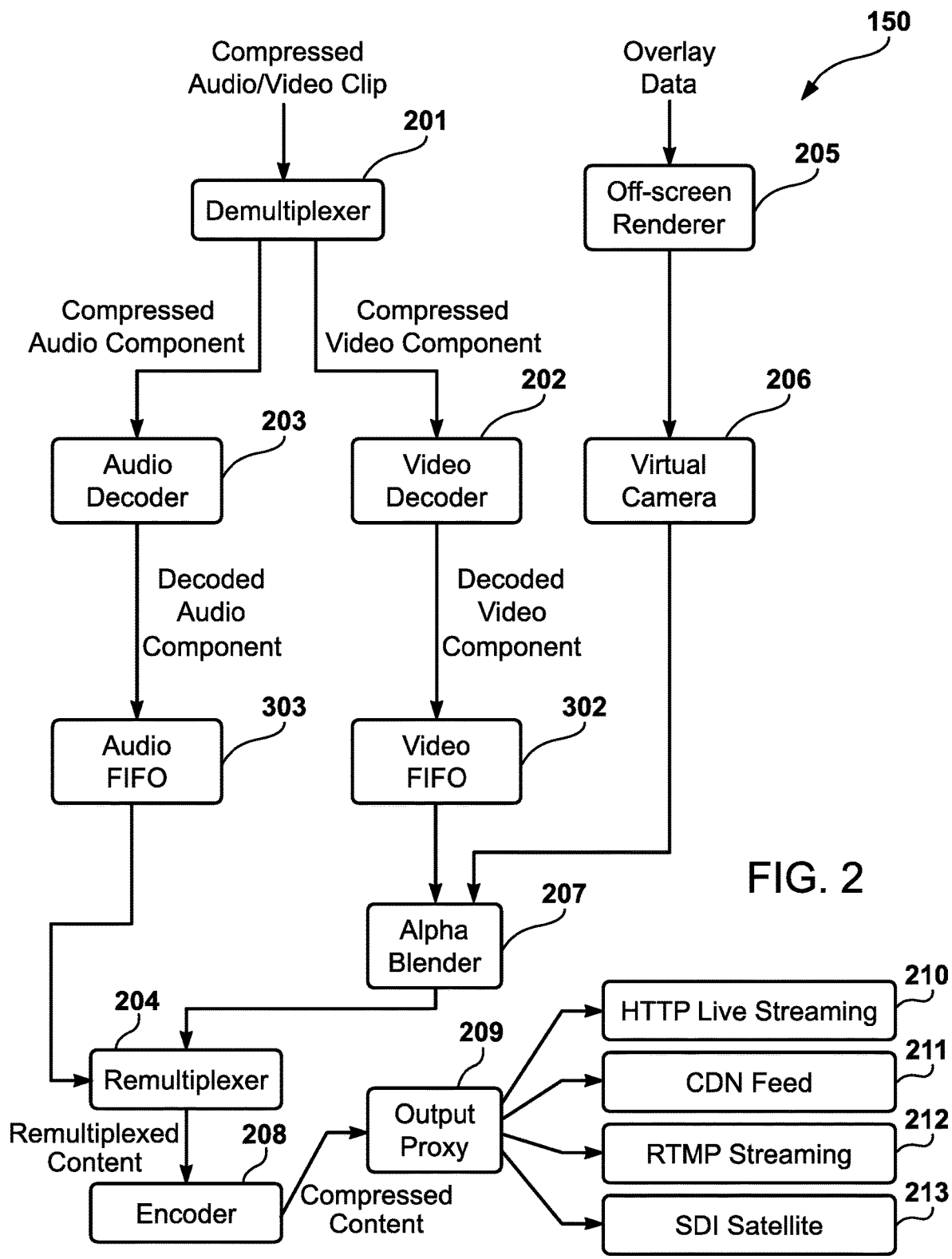
FIG. 2 illustrates componentry of the rendering code illustrated in FIGS. 1A and 1B.

FIG. 2 illustrates componentry of the rendering code 111 illustrated in FIGS. 1A and 1B. The processor 105 (FIGS.

1A and 1B), when executing the game core logic code 109 and/or the rendering code 111, receives a plurality of compressed video clips from the pre-recorded content database 112; those clips may include video and/or audio content. In one embodiment, the processor 105, when executing the rendering code 111, may compose a queue of video clips (e.g., in the order received). The processor 105 may then execute the rendering code 111 to compose the rendering data based on each video clip in turn.

For instance, a compressed video clip that is at the front of the queue may be provided by the processor 105 to a demultiplexer 201, which demultiplexes the compressed video clip into its compressed video components and compressed audio components. The processor 105 provides the compressed audio component to an audio decoder 203, which decodes the compressed audio component into its uncompressed audio format, and the compressed video component to a video decoder 202, which decodes the compressed video component into its uncompressed video format.

In one embodiment, the uncompressed video component is added to a first-in, first-out ("FIFO") video queue, and the audio component is added to a FIFO audio queue that is distinct from the FIFO video queue. (The FIFO queues may be stored in the memory device 107, the data storage device 108, or another non-transitory computer readable storage device.) Whereas the current decoded video component outputted from the FIFO video queues is processed via the processor 105 executing the rendering code 111, the current decoded audio component, as determined by first positioning in the FIFO audio queue, is not processed until the processing of the decoded video component has completed.

In other words, an audio/video clip is decomposed into its respective audio and video components (e.g., frames) to isolate the video component for processing individually from the audio component. After enhancing the video component, the processor 105 may execute the rendering code 111 to utilize a re-multiplexer 204 to recompose an audio/video clip with the original audio component and the enhanced video component.

As the end of a video component is about to be read by the processor 105, the rendering code 111 retrieves the next video component from the FIFO video queue. Accordingly, the FIFO video queue allows for enough buffering so that uncompressed video frames being subsequently read by the processor 105 are not completely consumed before the video decoder 202 begins decoding uncompressed video frames of the next A/V clip.

Figure 3:
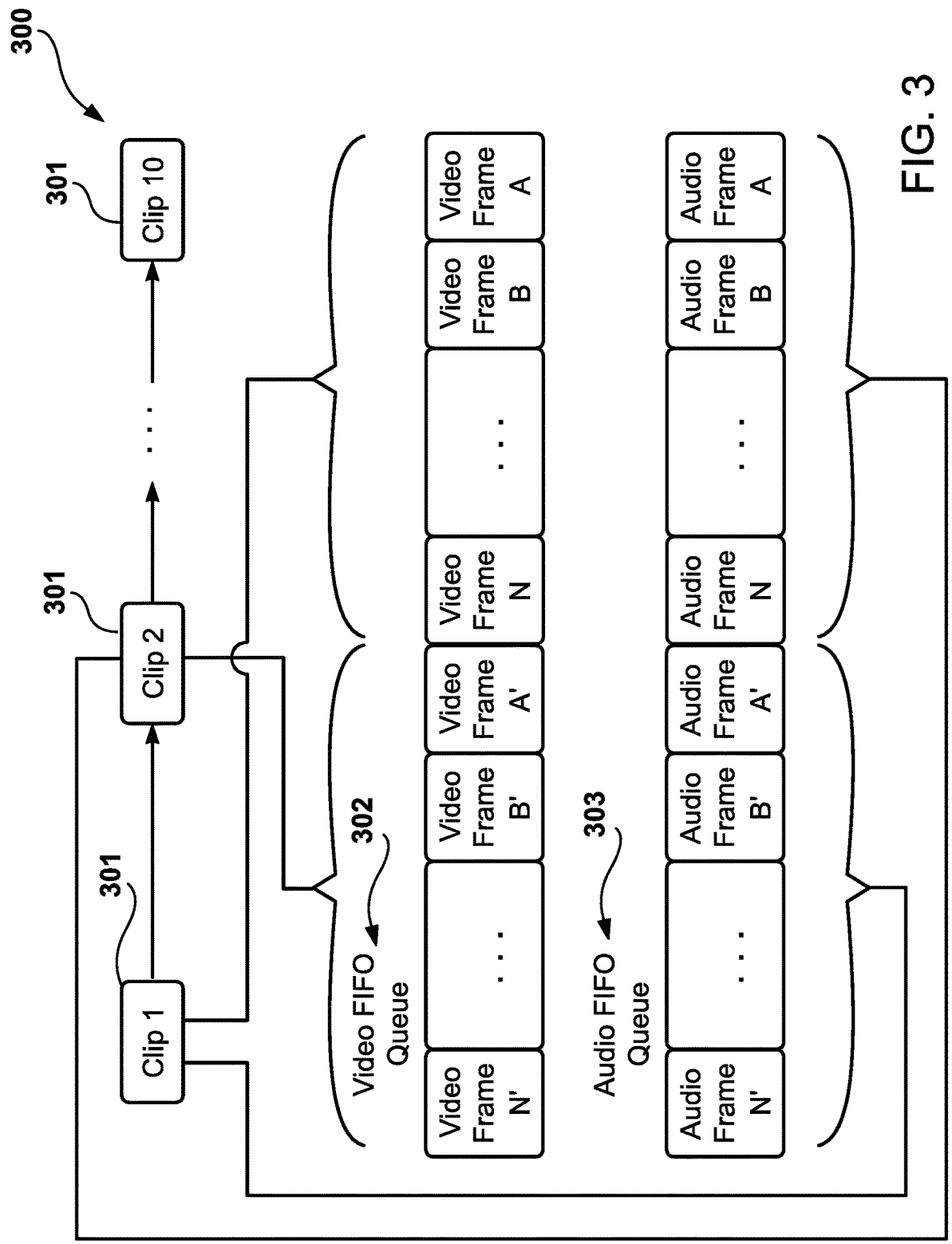
FIG. 3 illustrates an example of a pipeline that is utilized to process content for a VS game based on a series of previous skill-based events.

FIG. 3 illustrates an example of a pipeline 300 that is utilized to process content for a VS game based on a series of previous skill-based events. For instance, a plurality of A/V clips 301, each corresponding to a previous skill-based event occurring prior to initiation of the VS game, may be played back-to-back in a certain order for the VS game. Audio and video FIFOs are generated for each of the A/V clips 301. As an example, a video FIFO queue 302 for a first clip 301 has video frame A in the first position since video frame A is the first frame of the first clip 301, and an audio FIFO queue 303 for the first clip 301 has the audio frame A in the first position since audio frame A is the first frame of the first clip 301. Prior to decoding the last video frame N in the video FIFO queue 302, the processor 105 (FIGS. 1A and 1B) executes the rendering code 111 to ensure that enough of a buffer is present in the memory device 107 to allow the video decoder 202 (FIG. 2) to write decompressed video frames from a second clip 301 to the memory device 107. For instance, as the video decoder 202 is about to decode a last video frame N from the first video FIFO queue 302, the processor 105 executes, or previously executed, the rendering code 111 to free up memory that was previously occupied by video frames A through N of the first video FIFO queue 302; as a result, the memory device 107 has enough of a buffer for video frame A' of a second video FIFO queue 304. A threshold quantity of memory blocks may be allocated to the memory device 107 to write the video frame A' to the buffer faster than the broadcast frame rate (e.g., twenty five frames per second for high-definition content) of the video frame N. Therefore, playback appears to the user 102 (FIG. 1A) or the user 152 (FIG. 1B) as being gapless (e.g., no gap appears between the first clips 301 and the second clip 301 during playback).

By performing effective memory management, the processor 105 reduces memory requirements to improve the functioning of a computer. As A/V clips may exhaust large quantities of memory, conventional, simultaneous storage of A/V clips is ineffective for VS games (i.e., gaps between clips would result as too much memory from a current clip would consume memory necessary for a next clip). The pipeline 300 A/Voids the necessity of such significant memory requirements by managing memory according to FIFO on a per-clip basis to ensure adequate buffering for gapless playback of a series of video clips. Further, the pipeline 300 implementing such effective memory management allows for gapless playback to be rendered at the virtual gaming console 101 (FIG. 1A) or the mobile computing device 151 (FIG. 1B)—even without extra memory and/or software at the virtual gaming console 101 or the mobile computing device 151. In addition, the pipeline 300 may be implemented on a server, with or without a graphics card.

Returning to FIG. 2, the processor 105 executes the rendering code 111 to not only render a series of video clips, but also overlay data that enhances the video clips. The video clips may display a plurality of skill-based events as previously recorded (e.g., a plurality of soccer matches, football games, etc.); yet, such clips may alone not depict data directly related to an outcome of the VS game from the perspective of the user 102 (FIGS. 1A and 1B). For instance, a VS game score, which depends on the outcomes of a plurality of different events, is not displayed by the clips themselves.

Accordingly, in addition to receiving a compressed A/V clip, the processor 105 (FIGS. 1A and 1B) may also receive overlay data to be rendered in conjunction with a corresponding A/V clip. In one embodiment, the overlay data, which may be pertinent to the VS game and/or the events associated with the A/V clips themselves, are dynamic—changing throughout the VS game to pique the interest of the user 102 (FIGS. 1A and 1B). For example, the overlay data may include changing data such as team names, event location, etc. as the VS game seamlessly advances from one clip to the next. In an alternative embodiment, the overlay data is constant—persisting through at least a substantial portion, or possibly the entirety, of the VS game. For example, the overlay data may include a color scheme associated with a team that appears in all, or a substantial portion, of the video clips.

The rendering code 111 may include an off-screen renderer 205 that renders the overlay data not present in the on-screen rendering of the plurality of clips 301 illustrated in FIG. 3. In one embodiment, the off-screen render 205 utilizes web browser code (e.g., HTML5) to generate a layout, and perform rendering, of the overlay data in conjunction with the plurality of video clips 301. For example, the off-screen renderer 205 may be an HTML5 renderer that instantiates a browser window in the memory device 107 (FIGS. 1A and 1B). A webpage appearing in the browser window may be configured to have a transparent background according to an alpha variable. (In addition to conventional red, green, and blue ("RGB") values, the alpha value is specific to transparency.) As an example, a webpage with an alpha value of zero will be fully transparent.

The browser window generated by the off-screen renderer 205 may be updated to display the overlay data and a transparent portion for the remaining area of the browser window intended for the portion of the video clip over which no overlay data is intended to be present. In other words, the browser window may be updated to perform synchronized rendering of particular overlay data in conjunction with playback of a corresponding video frame of one of the A/V clips 301 illustrated in FIG. 3. Updates to the web browser window may be recorded as data blocks of blue, green, red, and alpha ("BGRA") pixels in the memory device 107 (FIGS. 1A and 1B).

Further, in one embodiment, the array of BGRA pixels is represented as a video camera feed. For instance, a virtual camera 206 may be configured to represent itself as a camera device to the operating system (e.g., via a device driver, native communications with the operating system, etc.). A plurality of variables (e.g., width, height, pixel format, color depth, etc.) may be associated with the virtual camera 206. After being initialized, the virtual camera may receive the overlay data as HTML5, or other browser code, frames. In other words, the off-screen renderer 205 renders a web browser that is a camera feed for the virtual camera 206.

Figure 4:
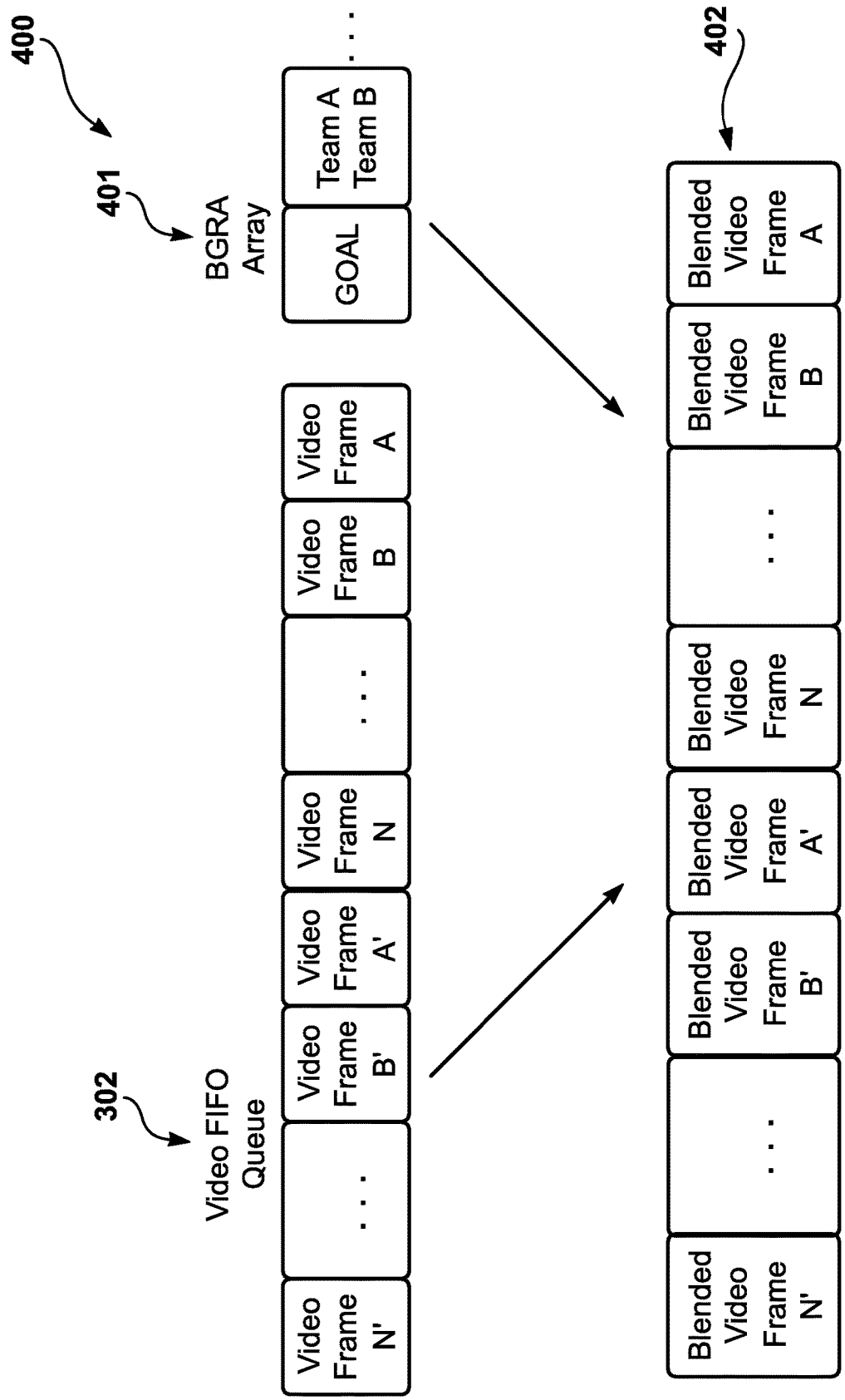
FIG. 4 illustrates a blending configuration.

After isolating the decompressed video frames from the plurality of A/V clips 301 into FIFO queues and capturing overlay data via the virtual camera 206, the processor 105 (FIGS. 1A and 1B) executes the rendering code 111 to invoke an alpha blender 207 to blend the overlay data captured by the virtual camera 206 over the video frames from the video FIFO queue 302 (FIG. 3). As illustrated by a blending configuration 400 in FIG. 4, the processor 105 (FIGS. 1A and 1B) reads data at a synchronized frame rate (e.g., a broadcast frame rate for playback) from the video FIFO 302 and a BGRA array of pixels 401. As a result, the processor 105 (FIGS. 1A and 1B) generates a blended video FIFO queue 402 in which the HTML5 camera pixels are alpha blended onto the FIFO video frames.

Returning once again to FIG. 2, the alpha blender 207 may blend video frames with overlay data in a synchronized manner utilizing a variety of different approaches. For example, the processor 105 may output the decompressed video frames 301 into a different type of data structure other than a FIFO-based data structure or may render the overlay data via a configuration other than a web browser-based system.

In one embodiment, after the alpha blending is performed by the alpha blender 207, the processor 105 (FIGS. 1A and 1B) executes the rendering code 111 to invoke a re-multiplexer 204 that re-multiplexes the de-multiplexed audio with the de-multiplexed, yet enhanced, video. The processor 105 executes the rendering code 111 to read the enhanced video frames from the alpha blender 207, or the memory device 107, and the audio from the audio FIFO queue 303. Further, the processor 105 executes the rendering code 111 to invoke an encoder 208 (e.g., MPEG encoder) to encode the re-multiplexed content into a compressed format that may be broadcasted to the user 102 (FIGS. 1A and 1B).

Accordingly, the processor 105 may execute the rendering code 111 to invoke an output proxy 209 that receives the compressed content encoded by the encoder 208 (e.g., at a broadcast frame rate) and sends the compressed content to the user 102 (e.g., at the broadcast frame rate) via one or more output systems (e.g., HTTP live streaming 210, a streaming format 211 sent to a content distribution network ("CDN") for distribution to the user 102, a streaming format 212 such as Real-Time Messaging Protocol ("RTMP") sent to a streaming service, a direct link to a Serial Digital Interface ("SDI") feed 213 for satellite broadcast, local playback, a file writing service that saves video clips for subsequent broadcast, etc.).

In addition to the componentry illustrated in FIG. 2, various other components may be utilized to supplement the rendering of a VS game. For instance, prior to the processor 105 executing the rendering code 111 to re-multiplex the alpha-blended video with the original audio, the processor 105 may also invoke a picture-in-picture blender to blend overlay data as windows that are relatively small to a main window depicting the video frames of the original content. Such picture-in-picture windows may be specifically resized video clips or video clip files that are dynamically resized as necessary. In one embodiment, the picture-in-picture rendering is performed without alpha transparency (i.e., the pixels from the smaller video completely overwrite the background pixels of the larger video).

In another embodiment, audio may be obtained from a third-party source (e.g., a live commentary of a virtual event such as the VS game). In other words, audio in addition to the audio that is broadcasted from the original event may be utilized with any rendering pipeline described herein.

Figure 5A:
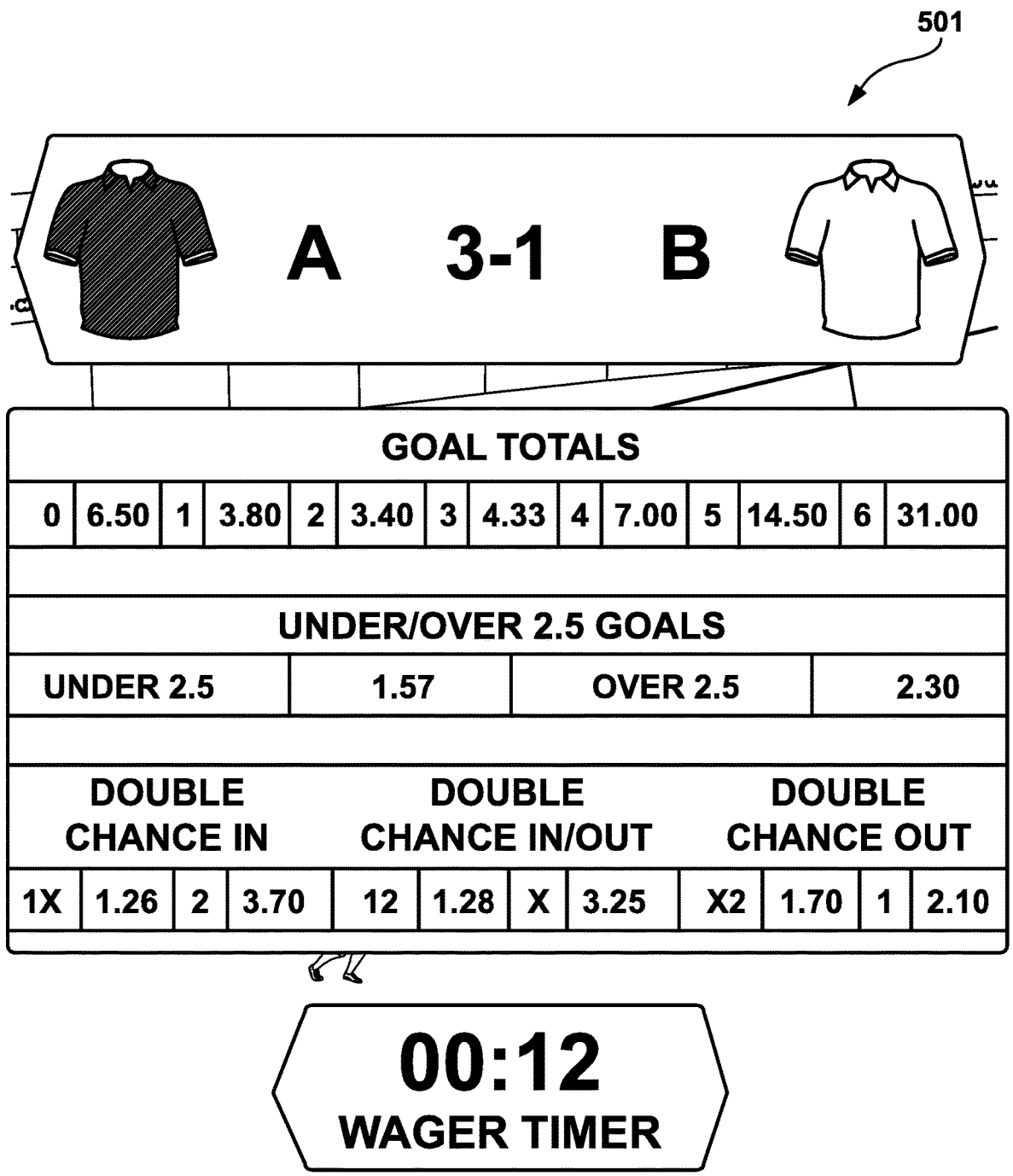
FIG. 5A illustrates an introductory screen that may be appended to the beginning of a sequence of A/V clips or overlaid on a particular A/V clip.

FIGS. 5A-5J illustrate examples of renderings generated by the processor 105 executing the rendering code 111 illustrated in the virtual game configuration 100 of FIGS. 1A and 1B. FIG. 5A illustrates an introductory screen 501 that may be appended to the beginning of a sequence of A/V clips 301 (FIG. 3) or overlaid on a particular A/V clip 301. The introductory screen 501 may include the names of participating teams (e.g., A and B), odds for various wagers, a timer for placing a wager in the VS game, etc. In other words, the introductory screen 501 displays data pertinent to the group of selected A/V clips for the VS game (e.g., odds for a total score in all of the selected clips) rather than data that just pertains solely to any one clip.

Figure 5B:
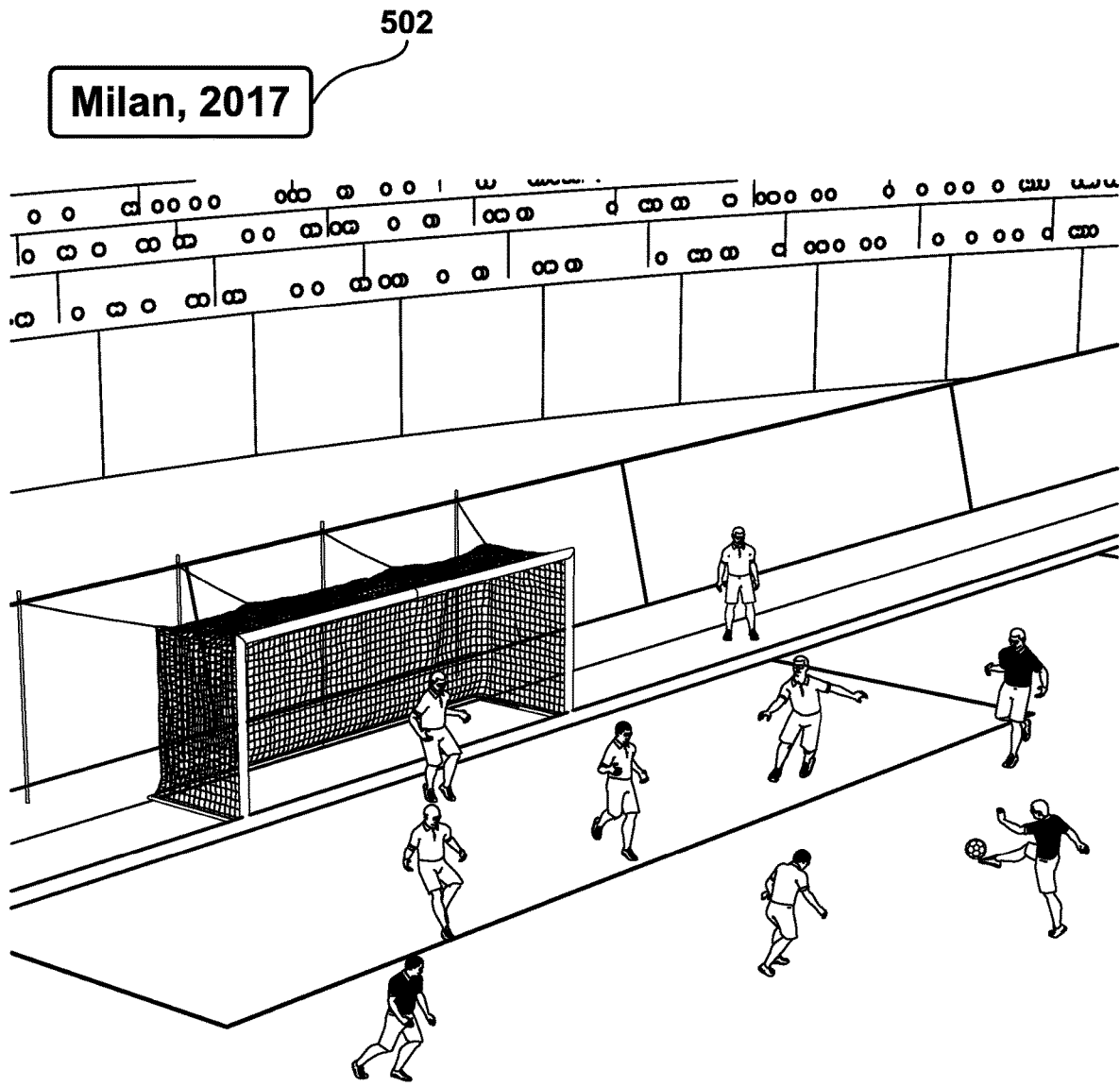
FIG. 5B illustrates a snapshot of a pre-recorded soccer game.
Figure 5C:
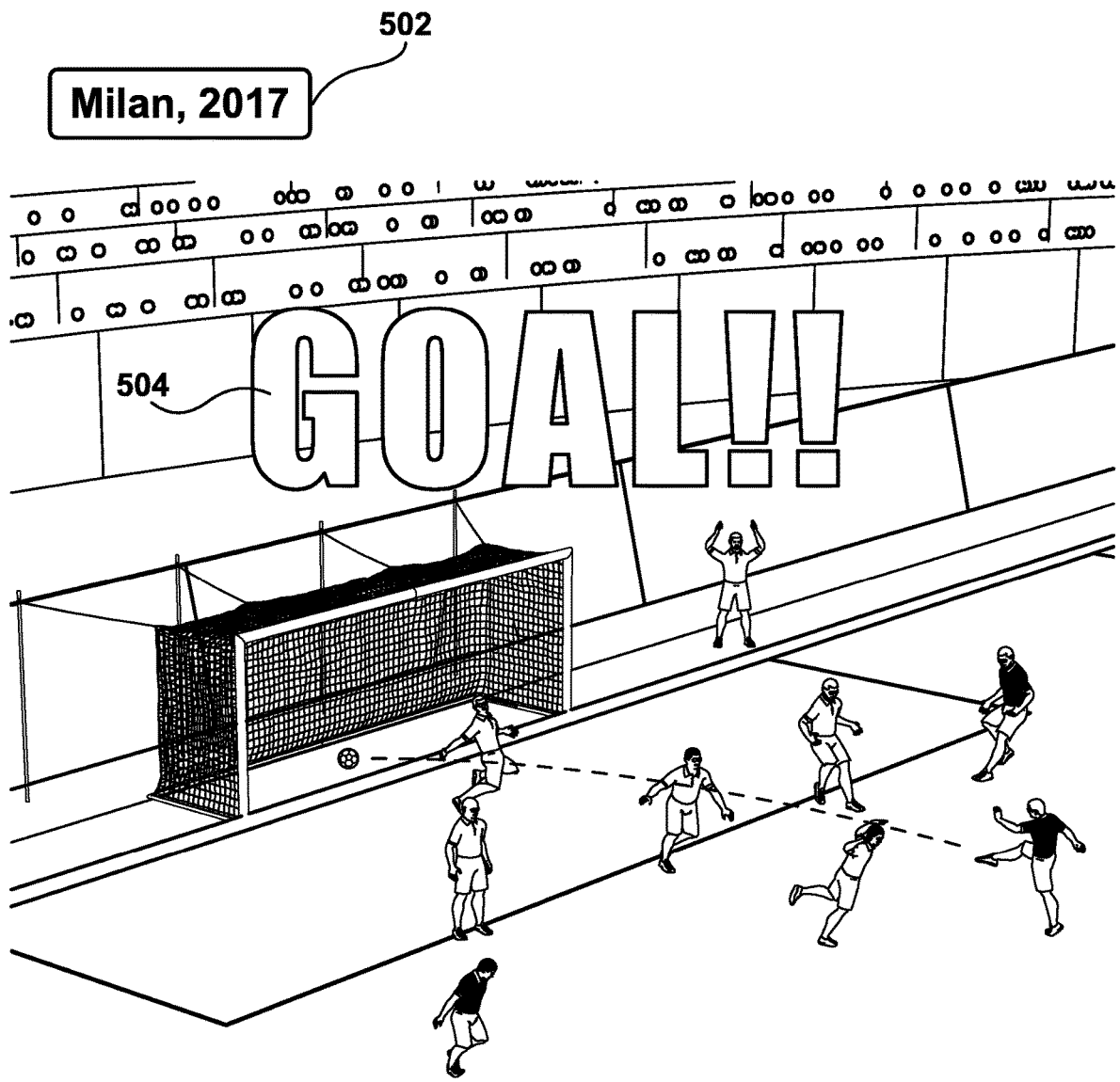
FIG. 5C illustrates a subsequent snapshot of the soccer game from the same A/V clip in which the kicked ball reaches the goal to score one point for team A.

FIG. 5B illustrates a snapshot of a pre-recorded soccer game. A data box 502 is overlaid onto the pre-recorded soccer game to depict the location and year of this particular A/V clip. Further, a data box 503 is overlaid onto the pre-recorded soccer game to depict the team names and respective scores in the VS game. For example, the score in the VS game is currently zero-zero, which may be quite different than the score for that soccer game at that juncture. However, one of the soccer players is kicking the soccer ball. FIG. 5C illustrates a subsequent snapshot of the soccer game from the same A/V clip 301 (FIG. 3) in which the kicked ball reaches the goal to score one point for team A. The data box 503 is updated to reflect the score of the VS game having one goal for team A. Further, text 504 stating "GOAL" is overlaid onto the pre-recorded soccer game.

Figure 5D:
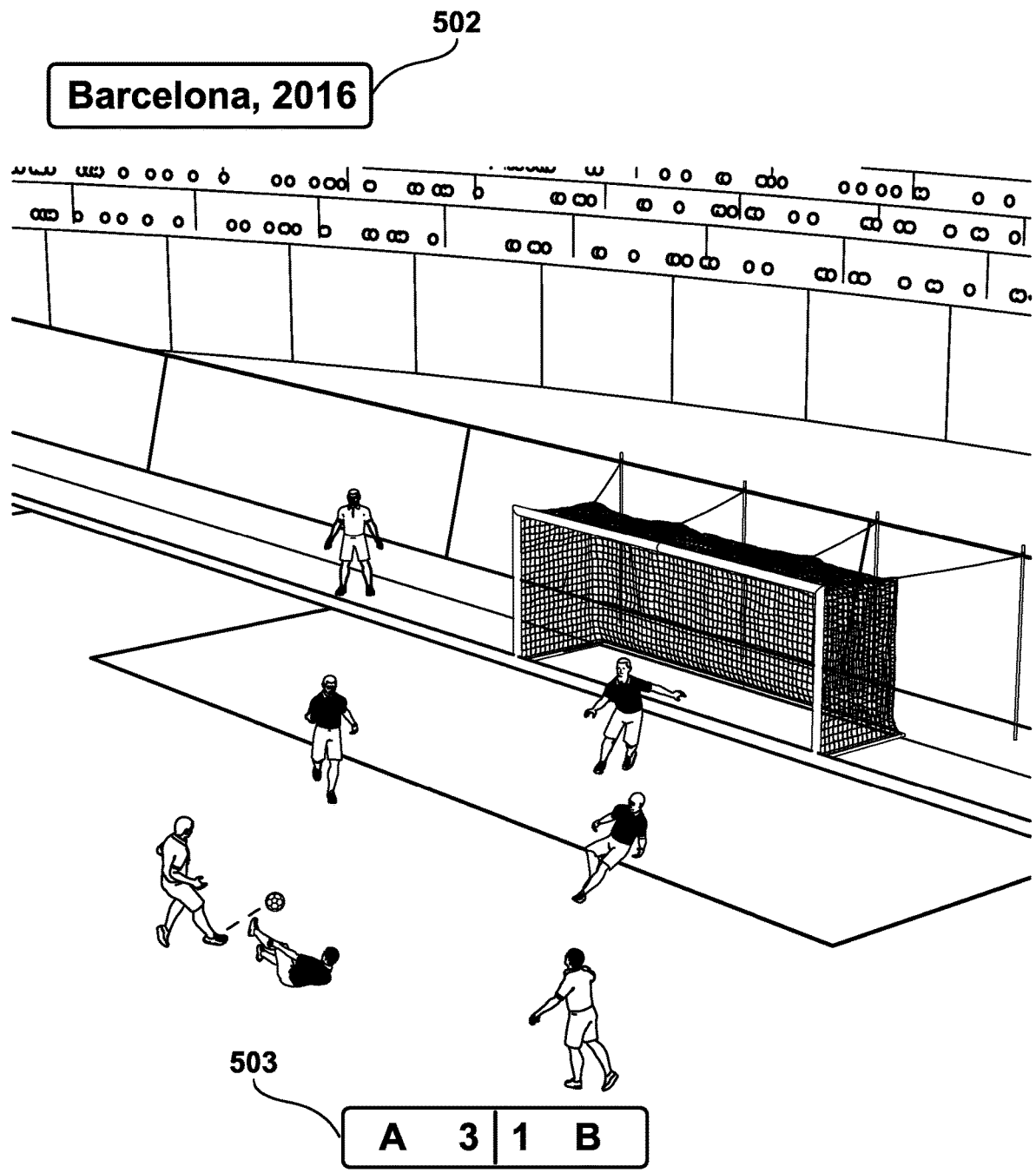
FIG. 5D illustrates a snapshot of a second A/V clip that is selected to be rendered after the A/V clip illustrated in FIGS. 5B and 5C.
Figure 5E:
FIG. 5E illustrates that the player missed the goal.

FIG. 5D illustrates a snapshot of a second A/V clip 301 (FIG. 3) that is selected to be rendered after the A/V clip 301 illustrated in FIGS. 5B and 5C. The data box 502 is updated to reflect a change in the location and year of the actual soccer game. One of the soccer players is depicted in an attempt to score a goal. FIG. 5E illustrates that the player missed the goal. Accordingly, text 505 stating "MISS" is overlaid onto the pre-recorded soccer game.

Figure 5F:
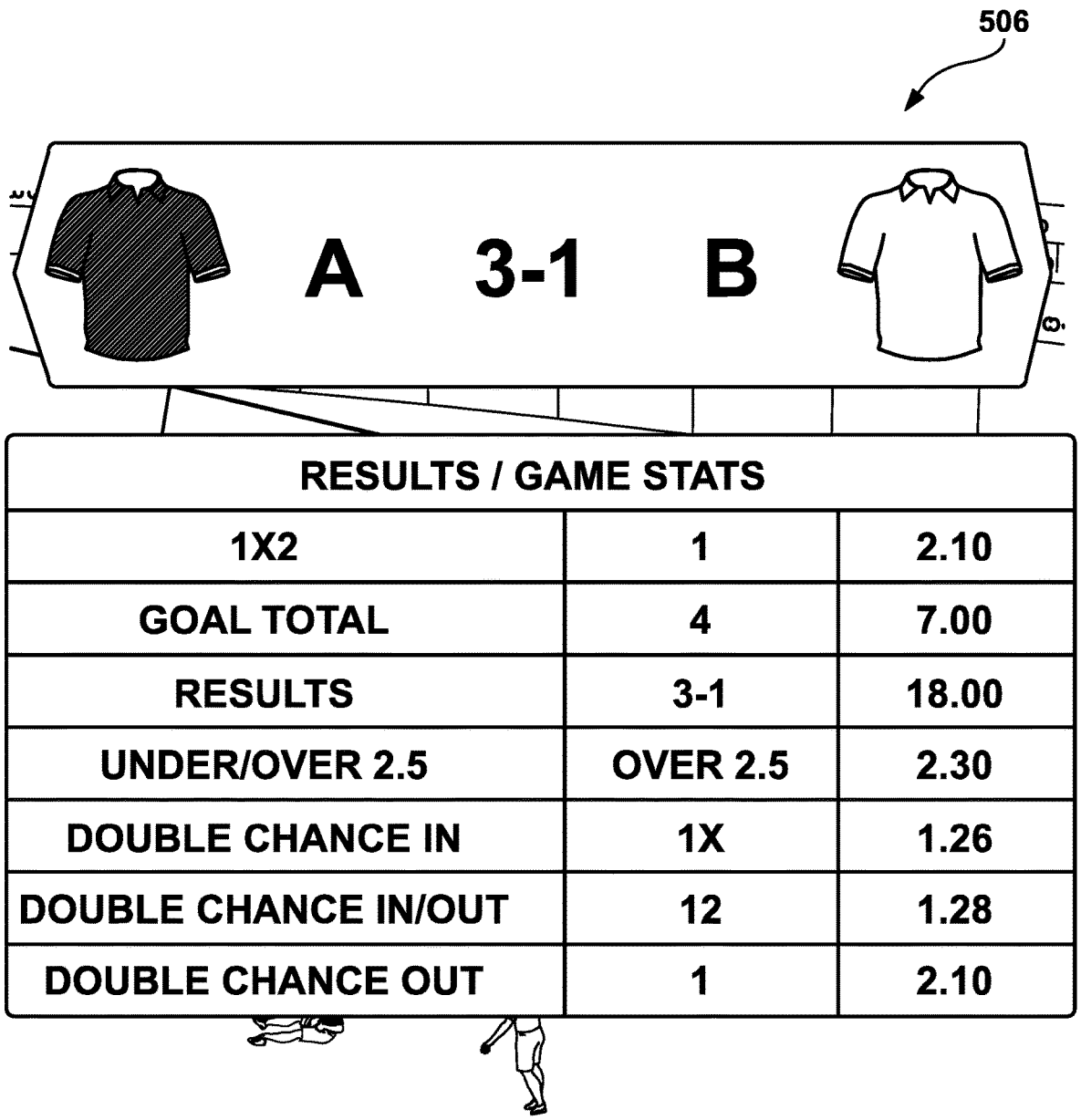
FIG. 5F illustrates a results screen that may be appended to the end of a sequence of A/V clips or overlaid on a particular A/V clip.

FIG. 5F illustrates a results screen 506 that may be appended to the end of a sequence of A/V clips 301 (FIG. 3) or overlaid on a particular A/V clip 301. The results screen 506 may include game statistics, goal totals, etc. Therefore, the player 102 (FIGS. 1A and 1B) of the VS game is able to view the results of the VS game.

Figure 5G:
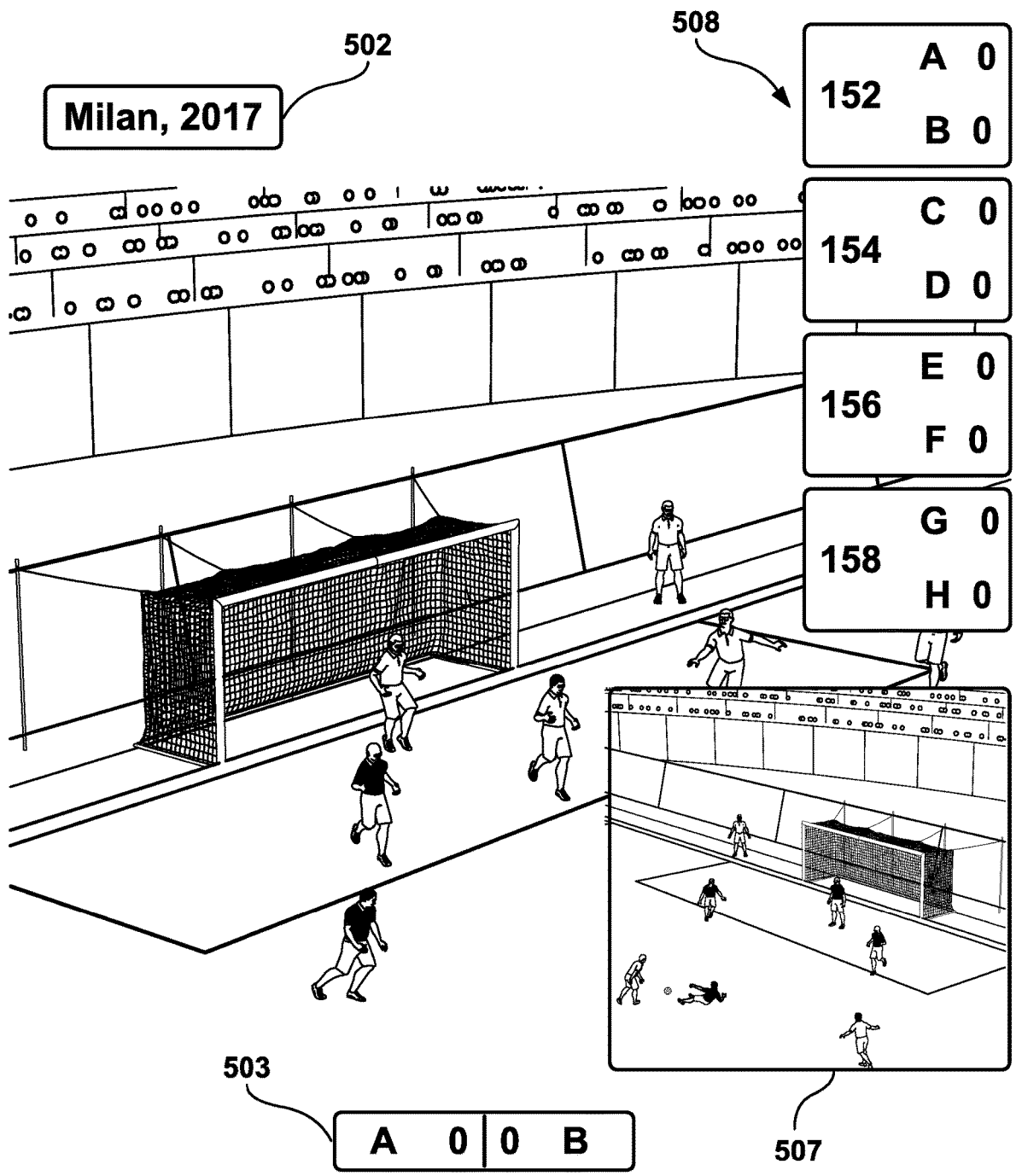
FIG. 5G illustrates a snapshot of a pre-recorded soccer game with a picture-in-picture display for other previously recorded soccer games.
Figure 5H:
FIG. 5H illustrates the text stating "GOAL" for a goal scored in the main screen.

In an alternative embodiment, a picture-in-picture display may be utilized to display one or more additional skill-based events. For example, the VS game may be based on a wager for multiple previously-recorded soccer games. FIG. 5G illustrates a snapshot of a pre-recorded soccer game with a picture-in-picture display 507 for other previously recorded soccer games. A panel 508 may be displayed in one portion (e.g., right side) of the screen to illustrate the scores of all, or some of, the soccer games. Further, the panel may be highlighted to indicate which game being displayed in the main screen or in the picture-in-picture display 507. FIG. 5H illustrates the text 504 stating "GOAL" for a goal scored in the main screen.

The soccer games illustrated in FIGS. 5A-5H are provided only as examples. Various other sporting events may be used for a VS game. Further, the configurations provided for herein may be used for various other skill-based events other than VS games.

Figure 6:
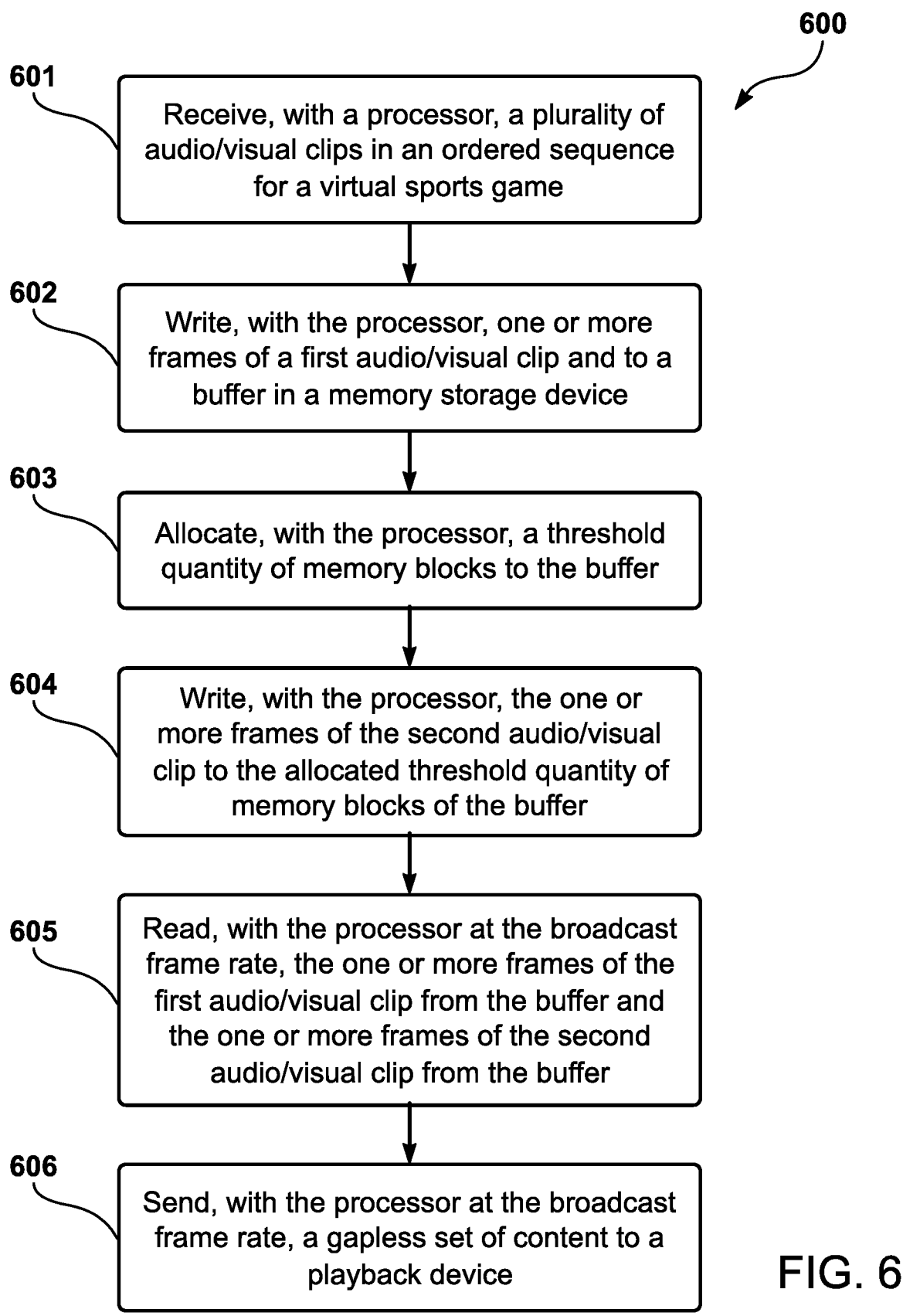
FIG. 6 illustrates a process that may be utilized to generate gapless content for a VS game.

FIG. 6 illustrates a process 600 that may be utilized to generate gapless content for a VS game. At a process block 601, the process 600 receives, with the processor 105 (FIGS. 1A and 1B), a plurality of A/V clips 301 (FIG. 3) in an ordered sequence for a VS game. Each of the plurality of A/V clips 301 corresponds to a sports-based event occurring prior to initiation of the VS game at a computing device. Further, at a process block 602, the process 600 writes, with the processor 105, one or more frames of a first A/V clip 301 to a buffer in a memory storage device 107, the one or more frames of the first A/V clip 301 being selected from the plurality of A/V clips 301.

Additionally, at a process block 603, the process 600 allocates, with the processor 105 (FIG. 1), a threshold quantity of memory blocks to the buffer. The threshold quantity of memory blocks being determined such that the processing speed of writing one or more frames of a second A/V clip 301 to the buffer is faster than a broadcast frame rate for broadcasting the first A/V clip. The broadcast frame rate is the rate (e.g., twenty five frames per second) at which content is broadcasted by a delivery mechanism (e.g., HTTP Live Streaming 210, CDN Feed 211, RTMP Streaming 212, SDI Satellite 213). The one or more frames of the second A/V clip 301 are selected from the plurality of A/V clips 301.

In one embodiment, the threshold quantity of memory blocks is based on the size (e.g., number of pixels) of the A/V clip 301. For example, one A/V clip 301 may have frames with more pixels than another A/V clip 301; thereby necessitating a larger quantity of memory blocks. In another embodiment, the threshold quantity of memory blocks is based on a time that is necessary to write data to the buffer at a rate that is faster than the broadcast frame rate. For instance, the threshold quantity of memory blocks may be configured so that the processor 105 is writing data to the buffer one second faster than the broadcast frame rate at which data is being read from the buffer. Therefore, the processor 105 may dynamically determine the threshold quantity of memory blocks based on a variety of changing variables. Alternatively, the processor 105 may utilize a predetermined threshold quantity of memory blocks instead of performing a recalculation for each A/V clip.

By adjusting the buffer based on the broadcast frame rate, the processor 105 ensures that the buffer always has enough data to be read before playback of previous frames has completed. Additionally, the buffer allows for reduced memory requirements as multiple A/V clips do not have to be simultaneously stored in the memory device 107.

At a process block 604, the process 600 writes, with the processor 105 (FIGS. 1A and 1B), the one or more frames of the second A/V clip 301 to the allocated threshold quantity of memory blocks of the buffer. Further, at a process block 605, the processor 105 reads, at the broadcast frame rate, the one or more frames of the first A/V clip from the buffer and the one or more frames of the second A/V clip from the buffer. In addition, at a process block 606, the processor 105 sends, at the broadcast frame rate, a gapless set of content to a playback device. The gapless set of content comprises the one or more video frames of the first A/V clip 301 and the one or more video frames of the second A/V clip 301.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a non-transitory computer readable medium having a computer readable program stored thereon, wherein the computer readable program when executed on a computer causes the computer to:

receive, with a processor, a plurality of audio/visual clips in an ordered sequence for a virtual sports game, each of the plurality of audio/visual clips corresponding to a sports-based event occurring prior to initiation of the virtual sports game at a computing device;

write, with the processor, one or more frames of a first audio/visual clip to a buffer in a memory storage device, the one or more frames of the first audio/visual clip being selected from the plurality of audio/visual clips;

allocate, with the processor, a threshold quantity of memory blocks to the buffer, the threshold quantity of memory blocks being determined such that the processing speed of writing one or more frames of a second audio/visual clip to the buffer is faster than a broadcast frame rate for broadcasting the first audio/visual clip, the one or more frames of the second audio/visual clip being selected from the plurality of audio/visual clips;

write, with the processor, the one or more frames of the second audio/visual clip to the allocated threshold quantity of memory blocks of the buffer;

read, with the processor at the broadcast frame rate, the one or more frames of the first audio/visual clip from the buffer and the one or more frames of the second audio/visual clip from the buffer; and send, with the processor at the broadcast frame rate, a gapless set of content to a playback device, the gapless set of content comprising the one or more video frames of the first audio/visual clip and the one or more video frames of the second audio/visual clip.

2. The computer program product of claim 1, wherein the threshold quantity of memory blocks is determined, at least in part, according to a size of a video frame.

3. The computer program product of claim 2, wherein the size of the video frame is based on a quantity of pixels in the video frame.

4. The computer program product of claim 3, wherein the threshold quantity of memory blocks is dynamically updated according to a change in the size of the video frame.

5. The computer program product of claim 1, wherein the threshold quantity of memory blocks is determined, at least in part, according to a predetermined amount of time.

6. The computer program product of claim 1, wherein the computer is further caused to:
de-multiplex, with the processor, the first audio/visual clip into a first compressed audio portion and a first compressed video portion;
decompress, with the processor, the first compressed audio portion into a first uncompressed audio portion and the first compressed video portion into a first uncompressed video portion;
enhance, with the processor, the first uncompressed video portion with overlay data;
re-multiplex, with the processor, the enhanced first uncompressed video portion with the first uncompressed audio portion; and
compress the re-multiplexed enhanced first uncompressed video into the gapless set of content.

7. The computer program product of claim 6, wherein the computer is further caused to capture, with a virtual camera, the overlay data generated by an off-screen renderer.

8. The computer program product of claim 1, wherein the buffer is a first-in, first-out queue.

9. The computer program product of claim 1, wherein the computer is further configured to receive a wager based on an outcome determined according to events displayed in the ordered sequence for a virtual sports game.

10. The computer program product of claim 1, wherein the computer is further caused to generate the overlay data based on events displayed in the ordered sequence for a virtual sports game.

11. The computer program product of claim 10, wherein the overlay data is based on a total score determined from the events displayed in the ordered sequence for the virtual sports game.

12. A system comprising:
a database that stores a plurality of audio/visual clips;
a memory device that has a buffer with a threshold quantity of memory blocks;
a processor that receives the plurality of audio/visual clips in an ordered sequence for a virtual sports game, writes one or more frames of a first audio/visual clip and to the buffer, allocates the threshold quantity of memory blocks such that the processing speed of writing one or more frames of a second audio/visual clip to the buffer is faster than a broadcast frame rate for broadcasting the first audio/visual clip, writes the one or more frames of the second audio/visual clip to the allocated threshold quantity of memory blocks of the buffer, reads, at the broadcast frame rate, the one or more frames of the first audio/visual clip from the buffer and the one or more frames of the second audio/visual clip from the buffer, and sends, at the broadcast frame rate, a gapless set of content to a playback device, the gapless set of content comprising the one or more video frames of the first audio/visual clip and the one or more video frames of the second audio/visual clip, each of the plurality of audio/visual clips corresponding to a sports-based event occurring prior to initiation of the virtual sports game at a computing device.

13. The system of claim 12, wherein the system further comprises a de-multiplexer that de-multiplexes the first audio/visual clip into a first compressed audio portion and a first compressed video portion.

14. The system of claim 13, wherein the system further comprises a decoder that decompresses the first compressed audio portion into a first uncompressed audio portion and the first compressed video portion into a first uncompressed video portion.

15. The system of claim 14, wherein the processor enhances the first uncompressed video portion with overlay data.

16. The system of claim 15, wherein the system further comprises a re-multiplexer that re-multiplexes the enhanced first uncompressed video portion with the first uncompressed audio portion.

17. The system of claim 16, wherein the system further comprises an encoder that compresses the re-multiplexed enhanced first uncompressed video into the gapless set of content.

18. The system of claim 15, further comprising an off-screen renderer that generates the overlay data.

19. The system of claim 18, further comprising a virtual camera that captures the overlay data.

20. A method comprising:
receiving, with a processor, a plurality of audio/visual clips in an ordered sequence for a virtual sports game, each of the plurality of audio/visual clips corresponding to a sports-based event occurring prior to initiation of the virtual sports game at a computing device;
writing, with the processor, one or more frames of a first audio/visual clip to a buffer in a memory storage device, the one or more frames of the first audio/visual clip being selected from the plurality of audio/visual clips;
allocating, with the processor, a threshold quantity of memory blocks to the buffer, the threshold quantity of memory blocks being determined such that the processing speed of writing one or more frames of a second audio/visual clip to the buffer is faster than a broadcast frame rate for broadcasting the first audio/visual clip, the one or more frames of the second audio/visual clip being selected from the plurality of audio/visual clips;
writing, with the processor, the one or more frames of the second audio/visual clip to the allocated threshold quantity of memory blocks of the buffer;
reading, with the processor at the broadcast frame rate, the one or more frames of the first audio/visual clip from the buffer and the one or more frames of the second audio/visual clip from the buffer; and
sending, with the processor at the broadcast frame rate, a gapless set of content to a playback device, the gapless set of content comprising the one or more video frames of the first audio/visual clip and the one or more video frames of the second audio/visual clip.

\* \* \* \* \*